United States Patent Office 3,306,124
Patented Feb. 28, 1967

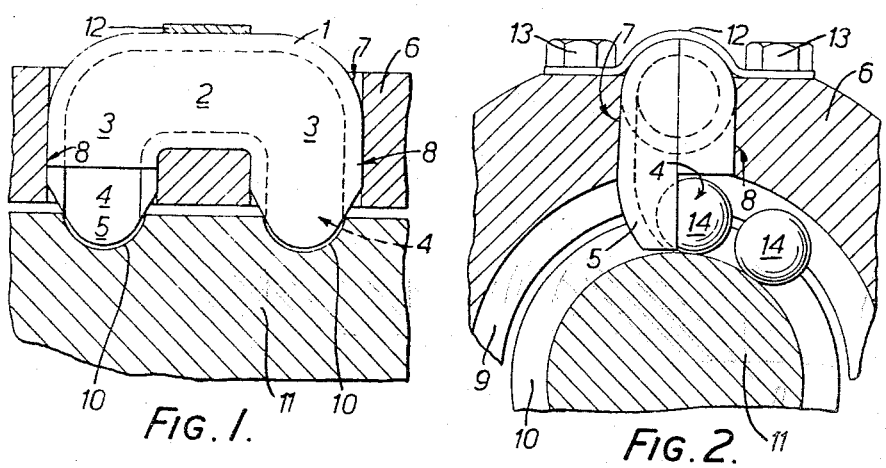
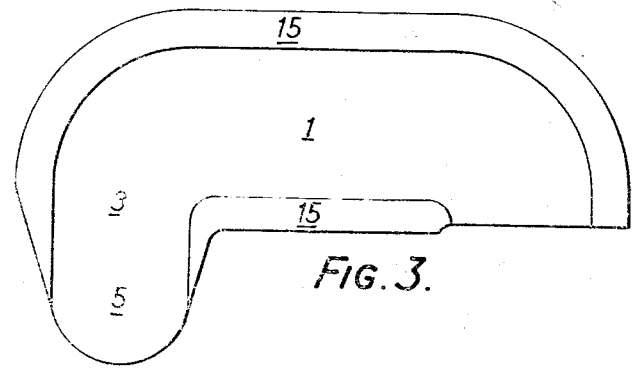
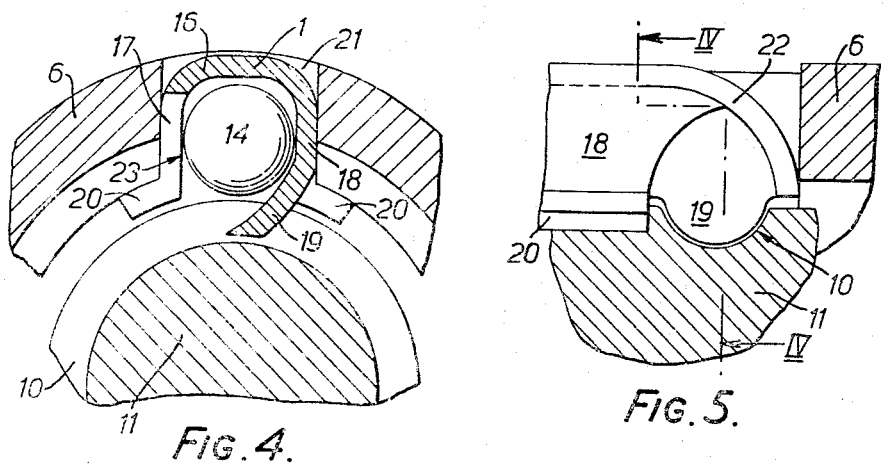

3,306,124
SCREW AND NUT DEVICES
Frederick J. Adams, Houghton Regis, near Dunstable, England, assignor to Cam Gears Limited
Filed Feb. 6, 1964, Ser. No. 342,962
Claims priority, application Great Britain, Feb. 18, 1963, 6,517/63
2 Claims. (Cl. 74—459)

This invention relates to screw and nut devices of the type in which co-operation between screw and the nut is effected through balls which move in a closed looped path a part of which is constituted by the helical track defined by the screw and the nut, the remainder of the path forming a return or transfer path by which the balls are returned from one end of the track to the other. Such devices are commonly referred to as being circulating ball type and are frequently employed in steering gear mechanisms.

The return or transfer path can be formed by a track which replaces a part of the normal track in the nut, this return track being formed to remove the balls from one point of a turn on the screw thread to cause them to roll over the crest of the helix on the screw and then return them to another point on the same turn of the helix, and in this type of arrangement the return track can be formed as a separate insert piece which is fitted to the nut to replace a part of the normal helical track formed in the nut and the present invention is concerned with such an arrangement.

According to the present invention a screw and nut device is presented in which co-operation between the screw and nut is effected through balls which move in a closed looped path, a part of which is constituted by a helical track defined by the screw and the nut and the remainder is defined by a track formed in an insert piece in the nut which has ball guide means which extend into the part of the helical track defined by the screw.

Preferably the guide means are in the form of scoop portions which extend into the screw thread to provide a smooth transfer of the balls from the screw thread into the insert.

The insert may be in the form of a tube the walls of which are shaped to provide the appropriate scoop portions at each end thereof. Such a tube may be formed by a pair of identical halves which are placed together so that the openings to the tube face in opposite directions and are in line with the depressions in the screw thread with which they are to operate.

In an alternative arrangement the insert may be in the form of a channel member, each of the scoop portions being formed by opposite end portions of each of the side walls.

In any case the insert is preferably arranged in an opening extending through the wall of the nut, and is held in place against radial movement by either a band secured to the external surface of the nut and extending across the insert, or by means of internal flanges which extend in a circumferential direction inside the nut. The latter arrangement is particularly suitable for use when the insert is in the form of a channel member.

It will be appreciated that with the arrangements as set forth above the balls can be transferred back to an earlier point in the groove in the screw thread by moving them in a line approximately parallel with the axis of the nut, which results in there being an almost complete row of effective balls within the nut.

The invention is particularly useful for use in steering gear mechanisms and according to another aspect includes a steering gear mechanism incorporating a screw and nut mechanism as set forth above.

The invention may be performed in various ways but two specific embodiments will now be described by way of example and with reference to the accompanying drawings in which—

FIGURE 1 is a cross section side elevation of a screw and nut device with an insert according to the invention in position in the nut, FIGURE 2 is a cross sectional end elevation of the nut and screw device as shown in FIGURE 1, FIGURE 3 is a side elevation of one half of the insert shown in FIGURES 1 and 2, FIGURE 4 is a cross sectional end elevation of an alternative form of insert along the line 4—4 of FIGURE 3, and, FIGURE 5 is a partial side elevation of an insert and the appropriate portion of the nut and screw shown in FIGURE 4.

In the first arrangement to be described which forms part of the steering mechanism for a motor vehicle and as shown in FIGURES 1, 2 and 3, the insert 1 is in the form of a tube having a straight centre portion 2 and end portions 3 which are curved so that the general configuration of the tube is U-shaped. Opposite side portions of each of the tubes are cut away so that the openings 4 to the tube face in opposite directions and are at right angles to the axis of the arm portions. The remaining portion 5 of each of the arms is curved towards the general direction of the opening 4 so that it forms a scoop.

The insert 1 is mounted in a nut 6, the outer wall of which is provided with a groove 7, each end of which is formed with a bore 8 which extends right through the wall of the nut. The insert 1 is mounted in this groove 7 so that the arms 3 provided by its U-shape project through the bores 8 into the interior of the nut, the scoop shaped portions 5 standing proud of the bottom of the thread 9 formed in the nut 6. The groove 7 in the outer circumference of the nut is arranged so that each of the scooped-shaped portions 5 project into the groove forming the thread on the nut, which is of course in line with the groove 10 which provides the corresponding thread on the screw 11 with which the nut 6 is used. The insert 1 is maintained in position in its groove 7 by means of a strap 12 which passes over it and which is held in place by a pair of locking screws 13 which screw into the outer circumference of the nut.

The helical path or track provided by the co-operating grooves in the screw 11 and nut 6 is filled with balls 14, and a complete turn of the track containing the balls is only interrupted by the return path provided by the insert 1, with the result that a very large extent of the turn of the helical track can be packed with balls available to transmit load.

When the apparatus is used the balls flow around the helical groove 10 in the screw thread as it is turned, and are transferred back into the groove when they reach the insert 7, the scoop portion 5 which extends into the groove 10 at each end of the insert ensuring that the balls 14 are transferred smoothly from the screw 11 into the insert 1 and back again into the groove 10 in the screw.

As shown in FIGURE 3 the insert is fabricated with a pair of identical pressings one of which is shown in FIGURE 3 and which are joined together along the centre line of the tube. Each of these pressings is substantially U shaped and they are joined together by welding along their adjacent edges 15 to provide the oppositely facing openings into the tube as set forth above. It may not be necessary to connect the two pressings as they are held together by the shape of the bore 8 in which they are housed.

In the second embodiment as shown in FIGURES 4 and 5 the same reference numerals are used to indicate similar parts. In this case the insert 1 is made from a single pressing which is in the form of a substantially channel-shaped member 16 the opposite side walls 17, 18 of which are extended at opposite ends to provide scoop portions 19 which extend away from the side wall to which they are connected in a direction towards the longitudinal axis of the channel shaped portion 16.

The remainder of the edge of the channel shaped portion which is not formed to provide the scoop 19 is bent outwardly to form a location flange 20 on each side.

The insert is located in an aperture 21 formed in the wall of the nut 6, the location flanges 20 preventing its outward radial movement, and the scoop portions 19 projecting inwardly so that they extend inwardly into the groove 10 which provides the axial path in the associated screw 11.

Each wall 17, 18 of the channel member 16 is cut away opposite the scoop shaped portion 19 to allow side entry into the channel, and each axial end of the insert is curved as shown at 22 so that the direction of balls 14 entering the channel-shaped insert 16 via the side opening 23, and guided by the scoop shaped portion 19 is changed through 90° so that they proceed in a direction substantially parallel with the longitudinal axis of the screw. This direction is again changed through 90° when the balls 14 are issued from the insert 1 at the opposite end by the other scoop shaped portion 19 and then cut away in the wall of the channel 16 opposite to it.

In this arangement the insert can be made from a piece of flat sheet and the end 22 carried round to finish off the component.

Thus this second embodiment similarly provides a smooth transfer of balls in a re-circulating ball mechanism from one part of the helical groove in the screw to another part of the helical groove in a similar manner to that described with reference to the first embodiment.

In both the above arrangements the screw is connected to the input member of the steering gear with which they are used. It will of course be appreciated that the devices can also be utilised with other mechanisms than steering gears.

I claim:
1. A screw and nut device comprising a screw member and a nut member in rotatable relation to each other about a longitudinal axis; said members being substantially concentrically spaced from each other and defining therebetween a helical track; spherical balls positioned between said track; and means for transferring said balls from one position along said track to another position along said track in a path parallel to said longitudinal axis; wherein said means includes a path; said path being defined by an insert member having scooped ball guide means for providing terminations from said helical track at each of said positions and for guiding said balls into said path; wherein said member extends through a wall of said nut and is held against radial movement by means of internal flanges which extend in a circumferential direction inside a bore in said nut.

2. A screw and nut device comprising a screw member and a nut member in rotatable relation to each other about a longitudinal axis; said members being substantially concentrically spaced from each other and defining therebetween a helical track; spherical balls positioned within said track; and means for transferring said balls from one position along said track to another position along said track in a path parallel to said longitudinal axis; wherein said means includes a path; said path being defined by an insert member having scooped ball guide means for providing terminations from said helical track at each of said positions and for guiding said balls into said path; wherein said insert member comprises a unitary channel member having sidewalls, opposite end portions of which define said scooped ball guides; and wherein said insert member extends through a wall of said nut and is held against radial movement by means of internal flanges which extend in a circumferential direction inside a bore of said nut.

References Cited by the Examiner
UNITED STATES PATENTS

| 1,831,080 | 11/1931 | Schmidt | 74—459 |
| 1,967,482 | 7/1934 | Schmidt | 74—459 |
| 2,298,011 | 10/1942 | Hoffar | 74—459 |
| 2,425,938 | 8/1947 | Hoover. | |
| 2,497,424 | 2/1950 | Terdina et al. | 74—424.8 |
| 2,519,777 | 8/1950 | Cochrane | 74—459 |
| 2,623,403 | 12/1952 | Terdina | 74—459 |
| 3,124,969 | 3/1964 | Grabowski et al. | 74—459 X |
| 3,143,896 | 8/1964 | Edwards | 74—459 |
| 3,161,073 | 12/1964 | Deutsch et al. | 74—459 X |

OTHER REFERENCES 897,008   5/1962   Great Britain.

DAVID J. WILLIAMOWSKY, *Primary Examiner.*

L. H. GERIN, *Assistant Examiner.*